United States Patent
Shikano et al.

(10) Patent No.: US 12,423,636 B2
(45) Date of Patent: Sep. 23, 2025

(54) RISK MANAGEMENT SYSTEM AND METHOD

(71) Applicant: Hitachi, Ltd., Tokyo (JP)

(72) Inventors: Hiroaki Shikano, Tokyo (JP); Hiroki Miyamoto, Tokyo (JP); Hideya Yoshiuchi, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 463 days.

(21) Appl. No.: 17/971,423

(22) Filed: Oct. 21, 2022

(65) Prior Publication Data

US 2023/0132818 A1 May 4, 2023

(30) Foreign Application Priority Data

Oct. 26, 2021 (JP) ................................. 2021-175009

(51) Int. Cl.
*G06Q 10/0635* (2023.01)
*G06F 11/00* (2006.01)
(Continued)

(52) U.S. Cl.
CPC ....... *G06Q 10/0635* (2013.01); *G06F 11/004* (2013.01); *G06F 30/20* (2020.01);
(Continued)

(58) Field of Classification Search
CPC .... G06Q 10/0635; G06Q 50/06; G06Q 40/08; G06F 11/004; G06F 30/20; G06F 2113/04; G06N 7/01
See application file for complete search history.

(56) References Cited

U.S. PATENT DOCUMENTS

2014/0025363 A1* 1/2014 Zou .................. G06F 30/20
703/18
2017/0161859 A1 6/2017 Baumgartner et al.

FOREIGN PATENT DOCUMENTS

JP 2017-531248 A 10/2017
JP 2020030649 A * 2/2020
(Continued)

OTHER PUBLICATIONS

Office Action received in Japanese Application No. 2021-175009, dated Dec. 24, 2024, in 6 pages (with translation).

*Primary Examiner* — Mohammad Ali
*Assistant Examiner* — Dhruvkumar Patel
(74) *Attorney, Agent, or Firm* — Procopio, Cory, Hargreaves & Savitch LLP

(57) ABSTRACT

Risk element information indicating risk elements is acquired. An asset capable of becoming a fault due to a risk element indicated in the risk element information, and a fault probability that the asset becomes the fault are specified based on static configuration information. A risk model in which the asset capable of becoming the fault and the fault probability are associated is generated in advance. In response to a designated input, an one asset to be evaluated is specified as an evaluation target asset, based on the designated input. A risk related to the evaluation target asset is specified. A risk evaluation value being an index indicating a risk of the evaluation target asset is calculated based on the fault probability of the evaluation target asset and the static configuration information. The risk evaluation value of the evaluation target asset is associated with the asset of the risk model.

10 Claims, 14 Drawing Sheets

(51) Int. Cl.
*G06F 30/20* (2020.01)
*G06F 113/04* (2020.01)
*G06N 7/01* (2023.01)
*G06Q 50/06* (2024.01)

(52) U.S. Cl.
CPC ............... *G06N 7/01* (2023.01); *G06Q 50/06* (2013.01); *G06F 2113/04* (2020.01)

(56) References Cited

FOREIGN PATENT DOCUMENTS

| | | | |
|---|---|---|---|
| JP | 2021117781 A | * | 8/2021 |
| WO | 2021-152894 A1 | | 9/2020 |

* cited by examiner

FIG. 3

STATIC CONFIGURATION INFORMATION ~31

ASSET INFORMATION ~15

| ASSET ID | TYPE | ATTRIBUTE | NUMBER OF COMPONENTS | COMPONENT ID1 | COMPONENT TYPE 1 | | |
|---|---|---|---|---|---|---|---|
| G0002001 | POWER STATION | WIND FORCE | 180 | S00001 | BLADE 1 | | |
| G0003002 | POWER STATION | EXTRA-HIGH VOLTAGE TRANSFORMATION | 100 | S10001 | TRANSFORMER 1 | | |

CONFIGURATION INFORMATION ~12

| CONNECTION ID | CONNECTION SOURCE ASSET ID | CONNECTION DESTINATION ASSET ID | | |
|---|---|---|---|---|
| | | | | |
| | | | | |

GEO-TOPOGRAPHY INFORMATION ~11

| LANDSCAPE ID | COORDINATE RANGE | ATTRIBUTE | | |
|---|---|---|---|---|
| | (002, 020), (003, 021) | | | |
| | | | | |

FIG. 4

WORK LIST MANAGEMENT TABLE 51

| WORK ID | WORK PROCESS ID | WORK NAME | STANDARD OPERATION COST |
|---|---|---|---|
| 1 | 1002 | CONFIRMATION OF VOLTAGE VALUE | 30 |
| 2 | 1003 | DEVICE RESTART | 150 |
| 3 | 1004 | DEVICE STOP | 70 |
| 4 | 1005 | DEVICE DISCONNECTION | 110 |

FIG. 5

WORK PROCEDURE MANAGEMENT TABLE 52

| PROCESS ID | ASSET ID | COMPONENT ID | OPERATION ID | PARAMETER | OPERATIONAL COST |
|---|---|---|---|---|---|
| 1 | 002 (TRANSFORMER) | 010 (INSTRUMENT) | 001 (CONFIRM VALUE) | < 10 A | 0.1 |
| 2 | 002 (TRANSFORMER) | 021 (SWITCH) | 002 (ON) | ON | 0.1 |
| 3 | | | | | |
| 4 | | | | | |

FIG. 7

RELATED RISK INFORMATION 53

| RISK ID | RISK MODEL TYPE | DISASTER TYPE | RECOVERY PROCEDURE | STANDARD OPERATION COST FOR RECOVERY |
|---|---|---|---|---|
| 1 | GEOGRAPHIC | FLOOD | 200, 201, 202, 203 | 3000 |
| 2 | GEOGRAPHIC | LIGHTNING STRIKE | 4012 | 150 |
| 2 | RELATIONAL | CYBER ATTACKS | 322, 323, 324 | 1700 |
| 3 | ASSET INTERNAL | PARTS WEARING | 178, 179 | 500 |

FIG. 8

GEO-TOPOGRAPHY RISK MODEL 54

| LOCATION ID | LONGITUDE | LATITUDE | PROBABILITY | RISK |
|---|---|---|---|---|
| 1001 | 35.3321 | 128.66823 | IF PRECIP > 50 THEN 0.8<br>IF PRECIP > 30 THEN 0.2<br>ELSE 0 | FLOODING 3m |
| 1002 | | | | |
| 1003 | | | | |
| 1004 | | | | |

FIG. 9

CONNECTION RELATION RISK MODEL 55

| RELATION ID | ASSET ID | RELATED ASSET ID | RELATION | METHOD | PROBABILITY | RISK |
|---|---|---|---|---|---|---|
| 1001 | 2003 (SUBSTATION) | 2021 (CONTROL CENTER) | NETWORK CONNECTION | LOGICAL NETWORK | IF TRAFFIC > THRESHOLD THEN 0.6 | CYBER ATTACKS |
| 1002 | 2021 POWER POLE | 2022 POWER POLE | POWER CONNECTION | POWER LINE | IF WIND > 30M/MIN THEN 0.5 | LINE DISCONNECTION |
| 1003 | | | | | | |
| 1004 | | | | | | |

FIG. 10

ASSET INTERNAL RISK MODEL 56

| ASSET INTERNAL RISK ID | ASSET ID | COMPONENT ID | RELATION | PROBABILITY | RISK |
|---|---|---|---|---|---|
| 4005 | 2003 (SUBSTATION) | 1001 (TRANSFORMER1) | INTERNAL COMPONENT | IF AVG(SENSOR_VALUE) > THRESHOLD THEN 0.6 | PARTS WEARING |
| 4006 | 2003 (SUBSTATION) | 1002 (TRANSFORMER2) | INTERNAL COMPONENT | IF VAR(SENSOR)VALUE) > VTHRESHOLD THEN 0.5 | OIL DEGRADATION |
| | | | | | |
| | | | | | |

RISK MANAGEMENT SYSTEM AND METHOD

BACKGROUND

The present disclosure relates to an information processing technology of risk management.

Risk factors such as disasters, facility failures, cyber attacks, and physical attacks have recently been increasing in risk management of plants and the like. Further, plants and the like to be managed have become larger in size and complex, and the collection of information from assets that make up the plants, the determination regarding responses on the basis of the collected information, etc. have also become complicated.

Japanese Unexamined Patent Application Publication (Translation of PCT Application) No. 2017-531248 discloses a technology related to risk management. Japanese Unexamined Patent Application Publication (Translation of PCT Application) No. 2017-531248 discloses that risks are mapped in consideration of the influence of natural disasters in each region depending on a geographical location.

SUMMARY

The technology of Japanese Unexamined Patent Application Publication (Translation of PCT Application) No. 2017-531248 calculates the risk of each area due to the natural disasters. Therefore, when a plant or the like including various assets is subject to management, it is unsuitable for integrated management of overall risks to be managed while being conscious of each individual asset.

An object of the present disclosure is to provide a technology which enables appropriate risk management considering a configuration to be managed.

There is provided a risk management system according to one aspect of the present disclosure, for managing a risk of a fault occurring in a management target system including a plurality of assets arranged in each location and connected to each other, the risk management system including: a risk modeling unit which stores static configuration information of each asset included in the management target system, acquires risk element information indicating risk elements each of which becomes a factor causing a fault, specifies the asset capable of becoming a fault due to the risk element indicated in the risk element information; and a fault probability being a probability that the asset becomes the fault, on the basis of the static configuration information, and generates in advance a risk model in which the asset capable of becoming the fault and the fault probability are associated, and a risk mapping unit which in response to a designated input to be evaluated, specifies at least one asset to be evaluated as an evaluation target asset, on the basis of the designated input, specifies a risk model related to the evaluation target asset, calculates a risk evaluation value being an index indicating a risk of the evaluation target asset, on the basis of the fault probability of the evaluation target asset and the static configuration information, and associates the risk evaluation value of the evaluation target asset with the asset of the risk model.

According to one aspect of the present disclosure, appropriate risk management considering a configuration to be managed is made possible.

BRIEF DESCRIPTION OF THE DRAWINGS

FIG. 3 is a diagram showing a table example of static configuration information.

FIG. 4 is a diagram illustrating a work list management table.

FIG. 5 is a diagram illustrating a work procedure management table.

FIG. 7 is a diagram showing a table example of related risk information.

FIG. 8 is a diagram showing a table example of a geo-topography risk model.

FIG. 9 is a diagram showing a table example of a connection relation risk model.

FIG. 10 is a diagram showing a table example of an asset internal risk model.

DETAILED DESCRIPTION

Embodiments of the present invention will hereinafter be described with reference to the accompanying drawings.

Figure 1:
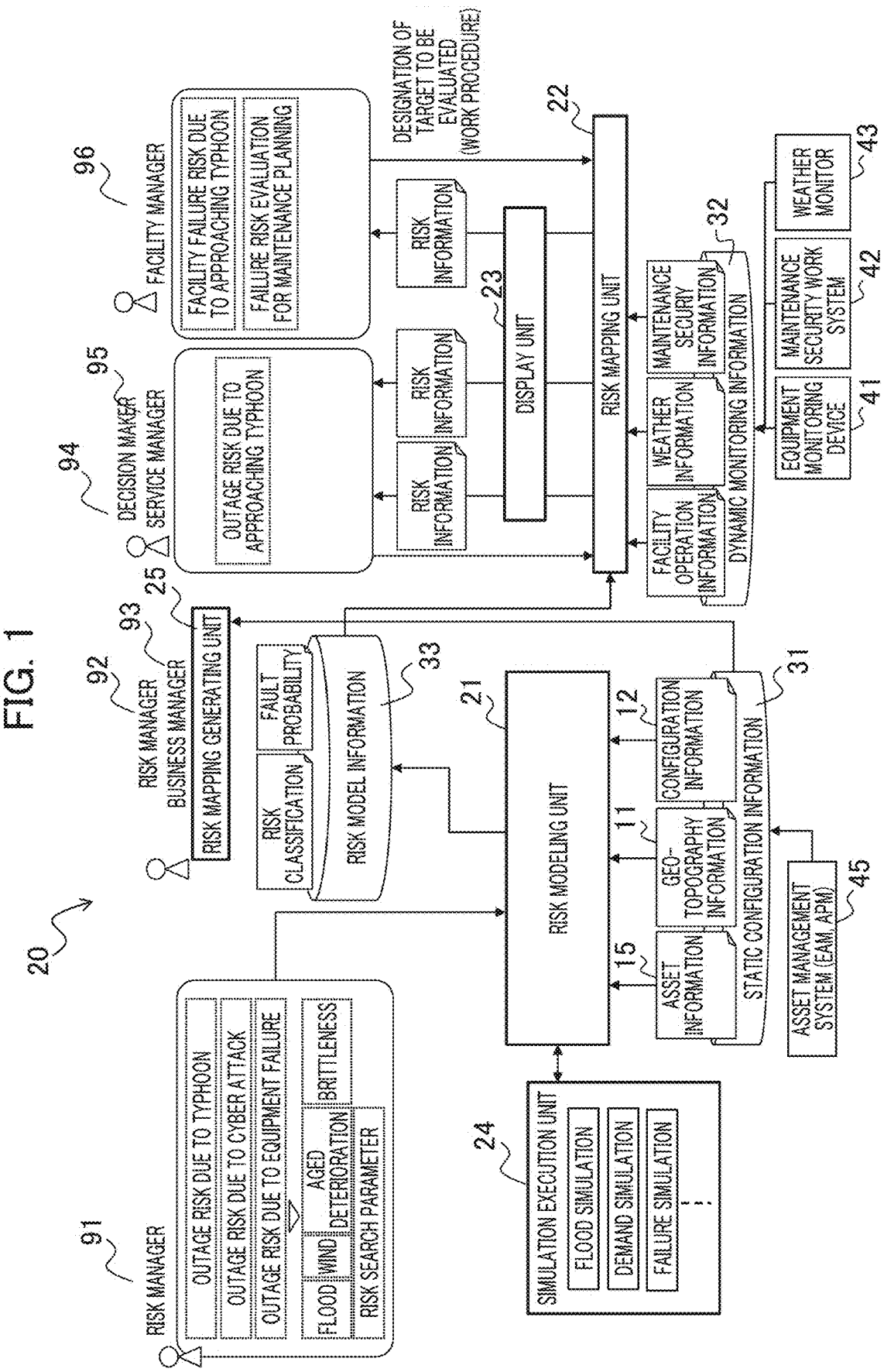
FIG. 1 is a block diagram showing a configuration of a risk management system.
Figure 2:
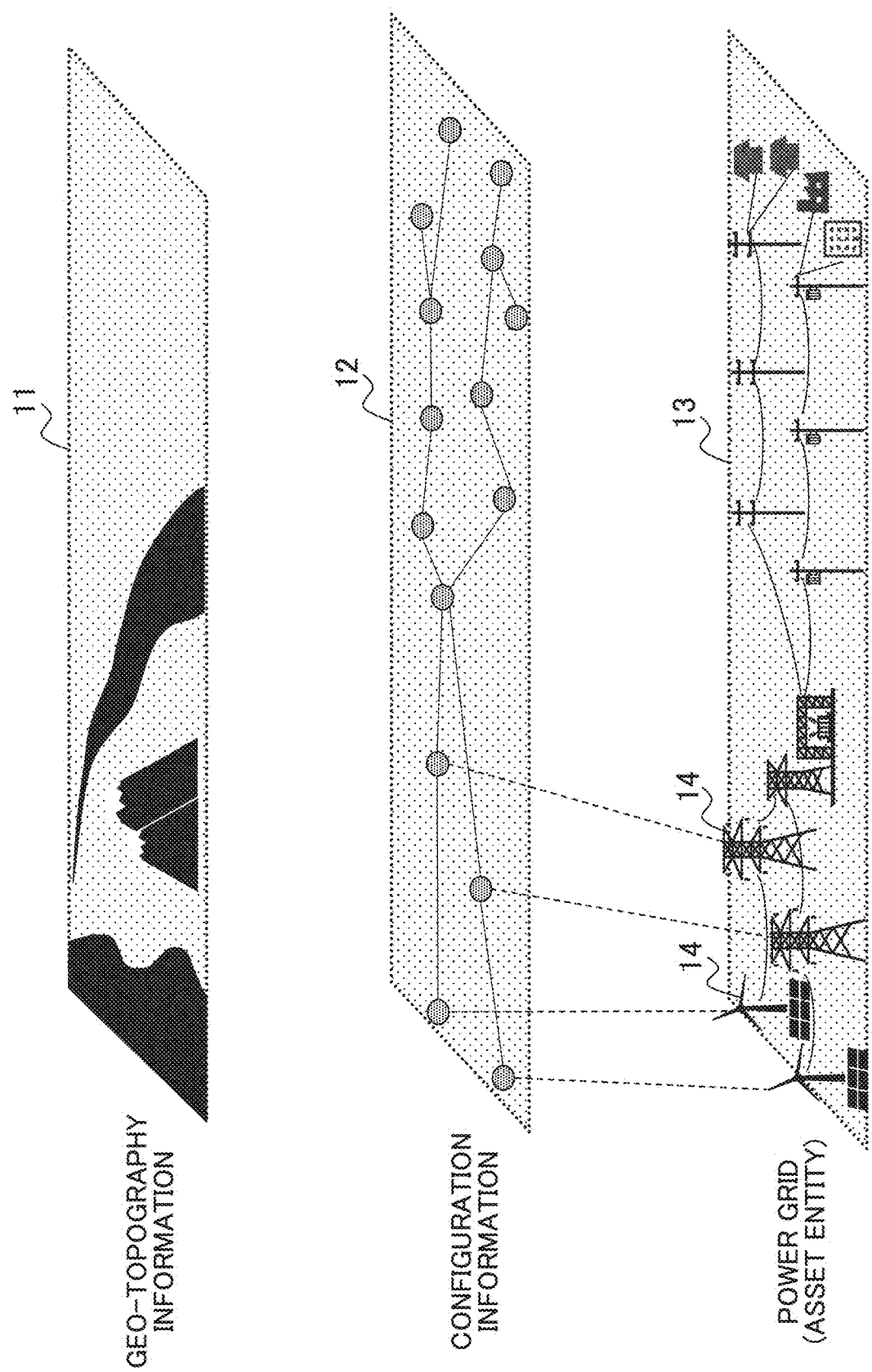
FIG. 2 is a diagram for describing information related to management targets of the risk management system.

FIG. 1 is a block diagram showing a configuration of a risk management system. FIG. 2 is a diagram for explaining information related to management targets of the risk management system.

In the present embodiment, there is exemplified a risk management system 20 for managing risks of various faults of a power grid 13 such as illustrated in a lower stage of FIG. 2 with the power grid 13 as a management target. Here, various facilities which make up the power grid 13 will be called assets 14. A fault refers to a condition which disturbs the normal operation of each asset. Incidentally, although the management target is not particularly limited, the management target of the risk management system 20 is not limited to the power grid 13. A system in which various facilities are arranged over a wide area and the facilities are physically or logically connected to each other is suitable.

Referring to FIG. 1, the risk management system 20 has a risk modeling unit 21, a risk mapping unit 22, a display unit 23, a simulation execution unit 24, and a risk mapping generating unit 25. The risk management system 20 is comprised of a computer which executes a software program by a processor. In the risk management system 20, the risk modeling unit 21, the risk mapping unit 22, the display unit 23, the simulation execution unit 24, and the risk mapping generating unit 25 are implemented by a processor executing a software program.

The risk modeling unit 21 calculates the asset 14 capable of becoming a fault and the probability that the asset 14 will become a fault, by a risk simulation on the basis of static configuration information 31 of the power grid 13 acquired from an asset management system 45 which manages the power grid 13. The risk modeling unit 21 generates and records in advance, risk model information 33 in which a fault capable of occurring in each asset 14 included in the power grid 13 is risk-modeled. At that time, the risk modeling unit 21 causes the simulation execution unit 24 to be described later to execute a simulation about risk elements that are the factors of assumed risks given from a risk manager 91, and acquires the simulation results from the simulation execution unit 24.

There are various types of simulations such as a flood simulation, a wind simulation, a power demand simulation, and a failure simulation, depending on risk elements. The simulation is executed using necessary information from the static configuration information 31 according to its type.

FIG. 3 is a diagram showing a table example of the static configuration information. The static configuration information 31 includes asset information 15, configuration information 12, and geo-topography information 11.

For example, since the flood simulation and the wind simulation are related to geography and topography, the geo-topography information 11 which records the geographic information and topographic information of the area where the assets 14 of the power grid 13 are arranged is utilized. The geo-topography information 11 records geographic information and topographic information of the area where the assets 14 of the power grid 13 are arranged. In the example of FIG. 3, the table of the geo-topography information 11 records information about each of unit blocks obtained by dividing the area in which the assets 14 of the power grid 13 are arranged into predetermined sizes. More specifically, in the example of FIG. 3, a block identifier (landscape ID), a coordinate range, and attributes of each unit block are recorded.

Since the power demand simulation is related to the connections between assets, configuration information 12 which records information about each connection between the assets in the power grid 13 is utilized. The configuration information 12 records information about each connection between the assets in the power grid 13. In the example of FIG. 3, a connection identifier (connection ID), a connection source asset identifier (connection source asset ID), and a connection destination asset identifier (connection destination asset ID) of each connection are recorded in the table of the configuration information 12.

Since the failure simulation is related to the configuration and internal state of the asset 14 itself, the asset information 15 in which each asset 14 of the power grid 13 is registered and various information about each asset 14 is recorded is utilized. Each asset 14 of the power grid 13 is registered in the asset information 15, and various information about each asset 14 is recorded therein. In the example of FIG. 3, in the table of the asset information 15, an asset identifier (asset ID), type, attribute, number of components, and each component identifier (component identifier and type) of each asset 14 are recorded. Further, the location and internal state of the asset 14 may be recorded in the asset information 15.

The risk mapping unit 22 specifies, from the risk model information 33, a risk model related to the asset 14 to be evaluated as specified by users such as a decision maker 94, a service manager 95, a facility manager 96, etc., like and calculates a risk evaluation value on the basis of the static configuration information 31 and the fault probability of the evaluation target asset. The evaluation target asset may be one determined according to the procedure of work in charge of the user who inputs the designation thereof.

FIG. 4 is a diagram exemplifying a work list management table. FIG. 5 is a diagram exemplifying a work procedure management table.

The work list management table 51 shows a list of work to be performed by the user on the asset 14. In the example of FIG. 4, a work identifier (Work ID), a work process identifier (Work process ID), a work name (Work name), and a standard operation cost (Standard operation cost) are defined for each work. The work procedure management table 52 shows the procedure of work that the user performs on the asset 14. In the example of FIG. 5, for each procedure, a process identifier (Process ID), a component identifier (Component ID) of a component to work on, an operation parameter (Parameter), and an operation cost (Operation cost) are associated and recorded.

The risk mapping unit 22 may refer to the work list management table 51 to specify the work related to the user, refer to the specified work procedure management table 52, and specify an asset being a work target in the work procedure as an evaluation target asset.

Also, the risk mapping unit 22 may modify a fault probability of the evaluation target asset, on the basis of dynamic monitoring information 32 including facility operation information of each asset 14 measured by an equipment monitoring device 41, maintenance security information recording maintenance and security performed on the facility managed by a maintenance security work system 42, and weather information collected by a weather monitor 43, and calculate the risk evaluation value of the evaluation target asset, on the basis of the modified fault probability and the static configuration information 31. The calculated risk evaluation value is associated with the asset 14 in the risk model and presented as risk information to the decision maker 94, the service manager 95, the facility manager 96, etc. via the display unit 23.

The display unit 23 displays a screen in which an image object corresponding to each of the assets 14 including the asset to be evaluated is displayed in a color or shape corresponding to the risk evaluation value of the asset 14, on the basis of the risk model with which the risk evaluation value is associated.

The simulation execution unit 24 executes a risk simulation according to an instruction from the risk modeling unit 21 and returns the result thereof to the risk modeling unit 21. The simulation execution unit 24 is capable of executing a flood simulation, a wind simulation, a power demand simulation, a failure simulation, and the like.

In the flood simulation, the probability of flood occurring due to flooding of rivers due to rainfall, etc. in the area where the assets 14 are arranged is calculated on the basis of, for example, the weather information assumed as a typhoon and the geo-topography information 11 conceptually illustrated in the upper stage of FIG. 2. The geo-topography information 11 includes geographic and topographical information of the area where the assets 14 of the power grid 13 are arranged. River flooding is simulated from the geographic and topographical information. In the wind simulation, the strength and direction of the wind at each location where the asset 14 is arranged are calculated on the basis of the weather information assumed as a typhoon and the geo-topography information 11, for example. In that case, for example, when calculating the risk of a power outage due to a typhoon, the risk modeling unit 21 may integrate the results of the flood simulation and the wind simulation to calculate the probability that the assets 14 in each location will become a fault.

Also, in the power demand simulation, time fluctuations in power demand in the power grid 13 are statistically predicted. In that case, for example, the risk modeling unit 21 may calculate the probability of occurrence of faults such as voltage deviation and a power outage, on the basis of the result of the power demand simulation. In the failure simulation, failures due to aged deterioration or the like of each asset 14 included in the power grid 13 are predicted. In that case, for example, the risk modeling unit 21 may calculate the probability that the asset 14 will become a fault due to a failure, on the basis of the result of the failure simulation.

On the basis of the static configuration information 31, the risk mapping generating unit 25 arranges each asset 14 of the power grid 13 registered in the asset information on a map on the basis of the geo-topography information 11, and generates a risk map in which the arrangement of each asset 14 and the connections between the assets 14 both shown in the configuration information 12 conceptually illustrated in the middle stage of FIG. 2 are associated with each other. The risk map is presented to and used by the risk manager 92 and the business manager 93.

Figure 6:
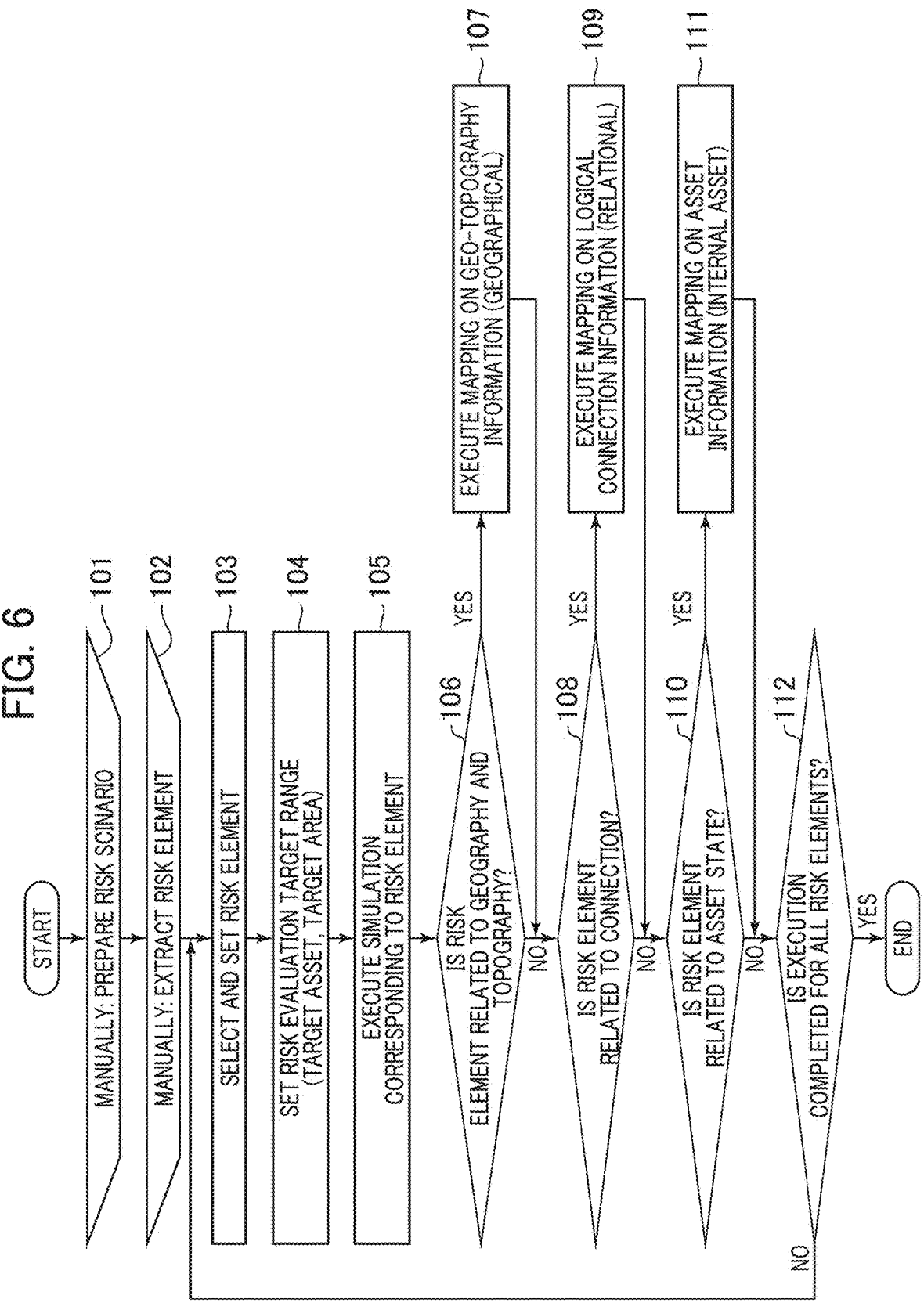
FIG. 6 is a flowchart of risk modeling processing.

FIG. 6 is a flowchart of risk modeling processing.

First, in Step 101, the risk manager 91 or the like prepares a risk scenario manually. The risk scenario is a scenario of an assumed fault in the power grid 13. As the risk scenarios, there are considered, for example, a power outage due to a typhoon, a power outage due to a cyber attack, a power outage due to an equipment failure, etc. From the risk scenarios, a possible fault of the asset 14 in the power grid 13 can be envisioned. In Step 102, the risk manager 91 or the like lists up risk elements from the risk scenario manually. The risk elements include situations defined in the risk scenario and target assets or target areas in which the situations occur. There are considered, for example, a typhoon in a geographic area, a cyber attack on an asset, or an equipment failure on an asset, etc.

In Step 103, the risk modeling unit 21 selects and sets any one of the listed risk elements.

In Step 104, the risk modeling unit 21 sets a risk evaluation target range from the set risk element. The risk evaluation target range represents the range of assets subject to risk evaluation. The risk evaluation target range may be one which specifies the asset to be evaluated, or may be one which specifies the area to be evaluated. When the area to be evaluated is set, the asset 14 arranged in that area becomes an evaluation target asset.

In Step 105, the risk modeling unit 21 executes a risk simulation corresponding to the risk elements, on the basis of the static configuration information 31, and calculates assets that can become faults and the probability that they will be faulty (fault probability). For example, if there is a typhoon in an area with risk elements, a flood simulation for that area and a simulation about the wind strength and direction in that area are performed. As described above, the risk modeling unit 21 causes the simulation execution unit 24 to execute the risk simulation and acquires the result thereof.

In Step 106, the risk modeling unit 21 determines whether or not the set risk element is related to geography and topography. The determination may be performed on the basis of the related risk information defined in advance. The related risk information is information in which the type of risk model and the type of risk element are associated with each other for each asset.

FIG. 7 is a diagram showing a table example of the related risk information. In the table of the related risk information 53 in FIG. 7, a risk element identifier (Risk ID), a risk model type (Risk model type), a risk element type (Disaster type), a recovery procedure (Recovery procedure), and a standard recovery cost (Standard operation cost for recovery) are recorded in association with each other for each risk element with respect to one asset 14. The risk model type includes geographic topography (Geographic), a connection relation (Geographic), and an asset internal state (Asset internal). The disaster type includes flood, lightning strike, cyber attacks, parts wearing, etc.

For example, when the risk element is related to the flood, the risk element is related to the Geographic as in the first line of the related risk information 53 of FIG. 7. If the risk element is related to the Geographic (Yes in Step 106), in Step 107, the risk modeling unit 21 generates a geo-topography risk model by associating assets that can become faults due to the risk elements and their fault probabilities with the locations of the assets in the geo-topography information.

FIG. 8 is a diagram showing a table example of the geo-topography risk model. The geo-topography risk model 54 divides the area where the assets 14 are arranged into unitary sections with meshes of a predetermined size, and defines fault probabilities for risk elements in each unitary section. In the example of FIG. 8, for each unitary section, a section identifier (Location ID) thereof, longitude (Longitude), latitude (Latitude), a fault probability (Probability), and a risk element (Risk) are recorded.

When the answer is No in Step 106, or in Step 108 after Step 107, the risk modeling unit 21 determines whether or not the set risk element is related to the connection between the assets. For example, if the risk element is a cyber attack to one asset, the risk element relates to the connection between the assets by a communication line. If the risk element is related to the connection between the assets (Yes in Step 108), in Step 109, the risk modeling unit 21 generates a connection relation risk model by associating the fault probability of each asset that can become a fault due to the risk element with the corresponding asset in the configuration information.

FIG. 9 is a diagram showing a table example of the connection relation risk model. The connection relation risk model 55 defines a fault probability for each risk element with respect to the asset connected to another asset. In the example of FIG. 9, a connection identifier (Relation ID) indicative of the connection between the assets, an asset identifier (Asset ID) of a target asset, an asset identifier (Related asset ID) of a connected asset, a connection type (Relation), a connection method (Method), a fault probability (Probability), and a risk element (Risk) are recorded in association with each other.

When the answer is No in Step 108, or in Step 110 after Step 109, the risk modeling unit 21 determines whether or not the set risk element is related to the internal state of the asset. For example, if the risk element is an equipment failure of one asset, the risk element relates to the internal information of the asset. If the risk element is one related to the internal state of the asset (Yes in Step 110), in Step 111, the risk modeling unit 21 generates an asset internal risk model by associating the fault probability of each asset that can become a fault due to the risk element with the corresponding asset.

FIG. 10 is a diagram showing a table example of the asset internal risk model. The asset internal risk model 56 is a table which defines fault probabilities of failures or the like caused by operating conditions inside the asset, such as deterioration of parts inside the asset. The asset internal risk model 56 defines the probability of a fault for the asset 14 as the asset itself. In the example of FIG. 10, an asset internal fault identifier (Asset ID), an asset identifier (Asset ID), a component identifier (Component ID), a relation (Relation), a fault probability (Probability), and a risk element (Risk) are recorded in association with each other.

When the answer is No in Step 110, or in Step 112 after Step 111, the risk modeling unit 21 determines whether or not all risk elements are processed. If all the risk elements are not processed (No in Step 112), the risk modeling unit 21 returns to Step 103, where the risk modeling unit 21 selects an unprocessed risk element and repeats the processing. If all the risk elements have been processed (Yes in Step 112), the risk modeling unit 21 terminates the risk modeling processing.

The various risk models generated by the risk modeling processing are recorded as the risk model information 33.

Figure 11:
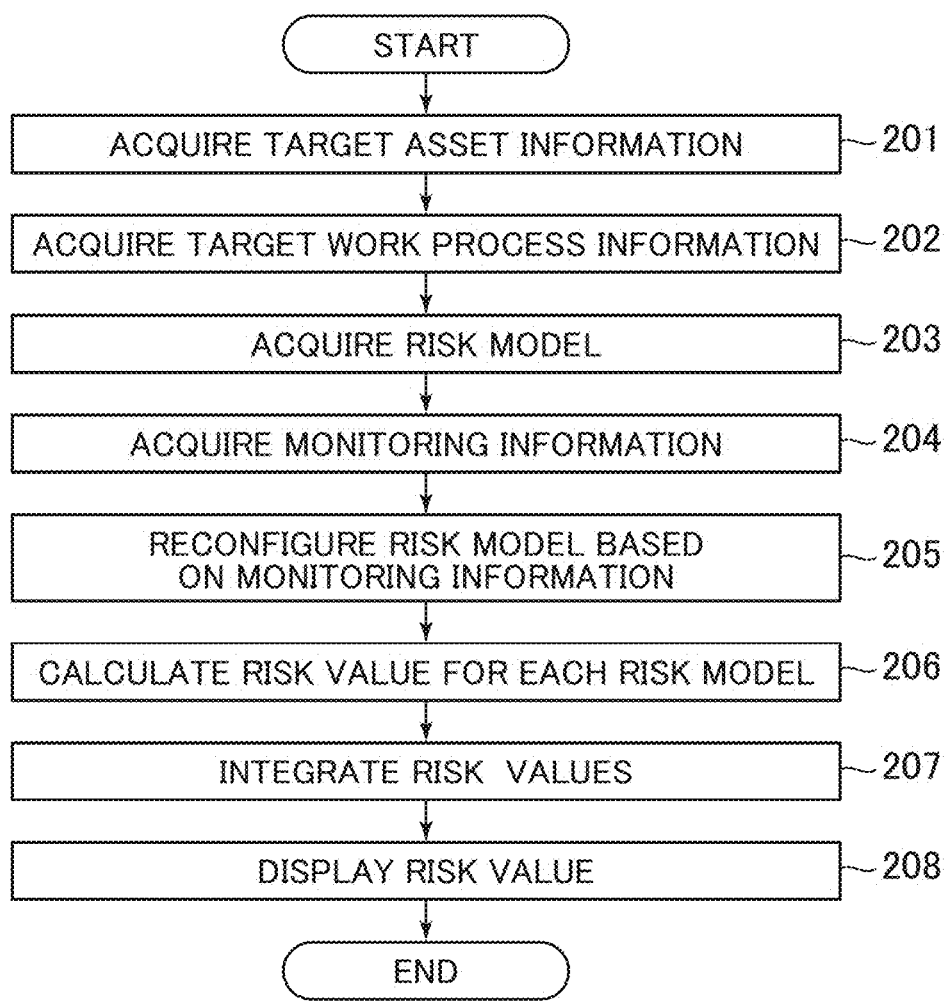
FIG. 11 is a flowchart of risk mapping processing.

FIG. 11 is a flowchart of risk mapping processing.

In Step 201, the risk mapping unit 22 determines an asset to be evaluated. The user may specify the range of each asset to be evaluated from a UI. Alternatively, the risk mapping unit 22 may specify the user from login information and specify the asset to be evaluated from the work in duty of the user.

In Step 202, the risk mapping unit 22 acquires information about the user's work content (procedure) for the asset.

In Step 203, the risk mapping unit 22 acquires a risk model related to the evaluation target asset acquired in Step 201 and the work content acquired in Step 202 from among the risk models recorded as the risk model information 33. At this time, a geo-topography risk model, a connection relation risk model, and an asset internal risk model related to the asset to be evaluated are acquired. Further, only some risk models may be acquired depending on the user's work content.

In Step 204, the risk mapping unit 22 acquires information related to the evaluation target asset from the dynamic monitoring information 32. Various types of dynamic monitoring information such as sensor information, weather information, access log, and information about cyber security related to the asset to be evaluated are acquired.

In Step 205, the risk mapping unit 22 reconfigures the risk model acquired in Step 203 according to the current situation, on the basis of the monitoring information obtained in Step 204. The fault probability is recalculated according to the conditions of the current power grid 13 and asset 14. A method of recalculation is not particularly limited, but it may be such that, for example, a plurality of mutually different simulation conditions are set, simulation is executed under each simulation condition to select the simulation condition in which the simulation result is closest to the monitoring information acquired in Step 204, and the risk model is updated according to the simulation condition. Alternatively, it may be such that the model value of a risk model is created from the monitoring information, and the risk model is updated so that the model value is obtained.

In Step 206, the risk mapping unit 22 calculates the risk evaluation value of each risk element that causes the fault of the asset to be evaluated. The risk element of the asset to be evaluated can be specified from the risk model acquired in Step 203. The risk evaluation value is calculated from a fault probability, a severity index, and a recovery cost.

When the risk element is related to geography and topography, the risk evaluation value is calculated by an equation (1) as an example.

$$\text{Risk evaluation value risk\_eval}(x,y,\text{asset\_id},\text{risk\_type}) = \int \text{probability}(t,x,y,\text{risk\_type}) * \text{criticality}(\text{asset\_id},x,y,\text{risk\_type}) * \text{recovery\_cost}(\text{asset\_id},x,y,\text{risk\_type})dt \quad (1)$$

Here, risk_eval is a value obtained by accumulating the product of probability, criticality, and recovery_cost for a specific period.

probability is a function that determines and returns a fault probability from the location (x, y), time (t), and risk type (risk_type) (flooding, lightning strike, etc.). Criticality is a function of returning the value of a severity index that determines whether there is an alternative means when the asset to be evaluated fails, according to the asset identifier (asset id), location (x, y), and type of risk (risk type). The alternative means includes a spare facility, redundantization, and the like. recovery cost is a function of determining and returning, when the asset subject to evaluation fails due to the corresponding risk element, the value of a recovery cost, which is the cost required for its recovery, according to the asset identifier (asset_id), location (x, y), and type of risk (risk_type). The recovery cost includes man-hours required for recovery work and facility costs required for asset replacement. These functions are set in advance.

When the risk element is related to the connection configuration and when the risk element is related to the asset internal state, the risk evaluation value is calculated by an equation (2) as an example.

$$\text{Risk evaluation value risk\_eval}(\text{asset\_id},\text{risk\_type}) = \int \text{probability}(t,\text{asset\_id},\text{risk\_type}) * \text{criticality}(\text{asset\_id},\text{risk\_type}) * \text{recovery\_cost}(\text{asset\_id},\text{risk\_type})dt \quad (2)$$

risk_eval in the equation (2) is a value obtained by accumulating the product of probability, criticality, and recovery cost for a specific period in a manner similar to the equation (1).

In the equation (2), probability is a function of determining and returning the value of a fault probability from the time (t), asset identifier (asset id), and type of risk (risk_type). Criticality is a function of returning the value of a severity index which determines whether or not there is an alternative means when the evaluation target asset fails, according to the asset identifier (asset id) and the type of risk (risk_type). recovery_cost is a function of determining and returning, when the evaluation target asset fails due to the corresponding risk element, the value of a recovery cost, which is the cost required for its recovery, according to the asset identifier (asset id) and the type of risk (risk_type).

In Step 207, the risk mapping unit 22 integrates the risk evaluation values calculated in Step 206. For example, the risk evaluation values calculated in Step 206 may be simply totaled, or may be weighted according to risk elements and totaled.

In Step 208, the risk mapping unit 22 displays the risk evaluation value and/or the risk model on the screen via the display unit 23. The display unit 23 can display the risk evaluation value and/or the risk model in graphical form from various cuts as desired by the user.

Figure 12:
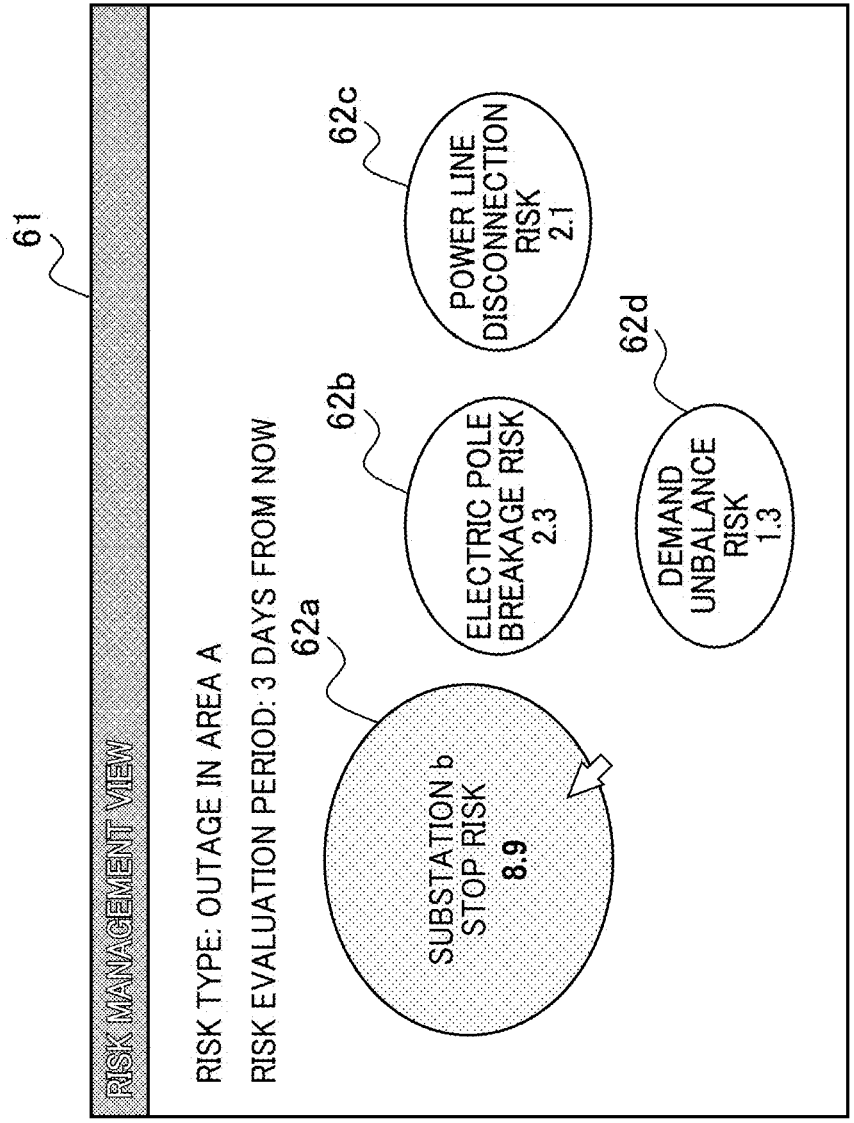
FIG. 12 is a diagram showing an example of a display screen.
Figure 13:
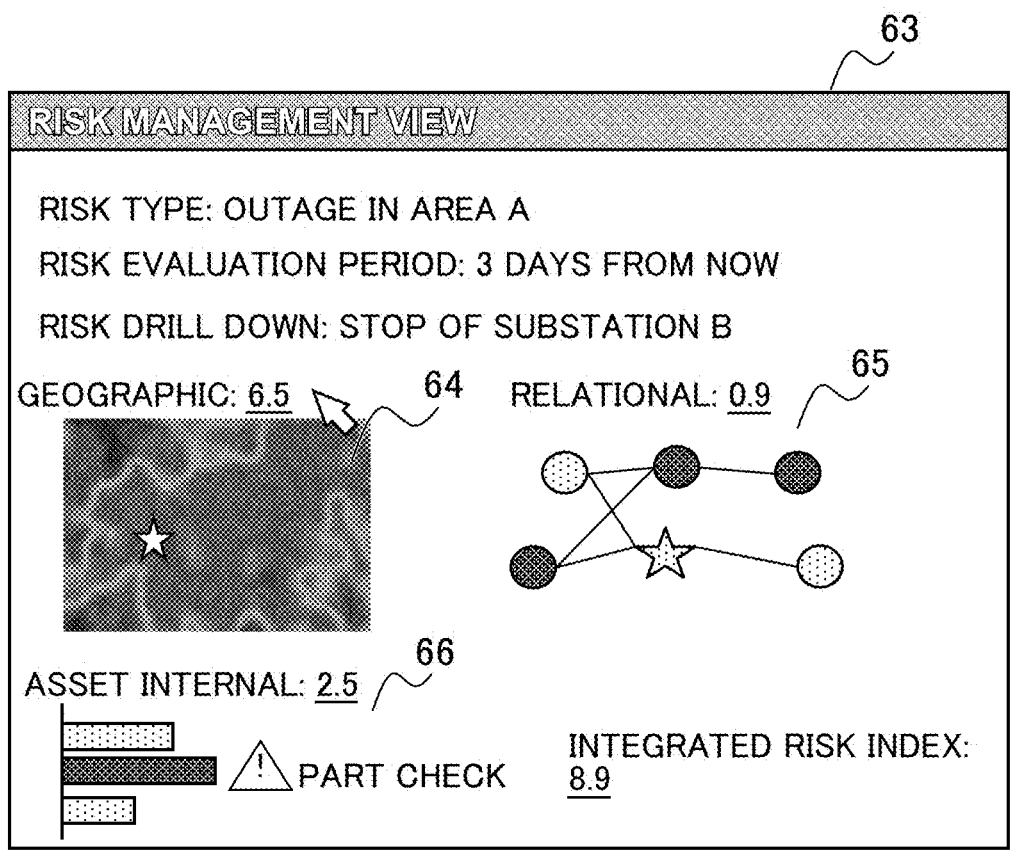
FIG. 13 is a diagram showing an example of a display screen.
Figure 14:
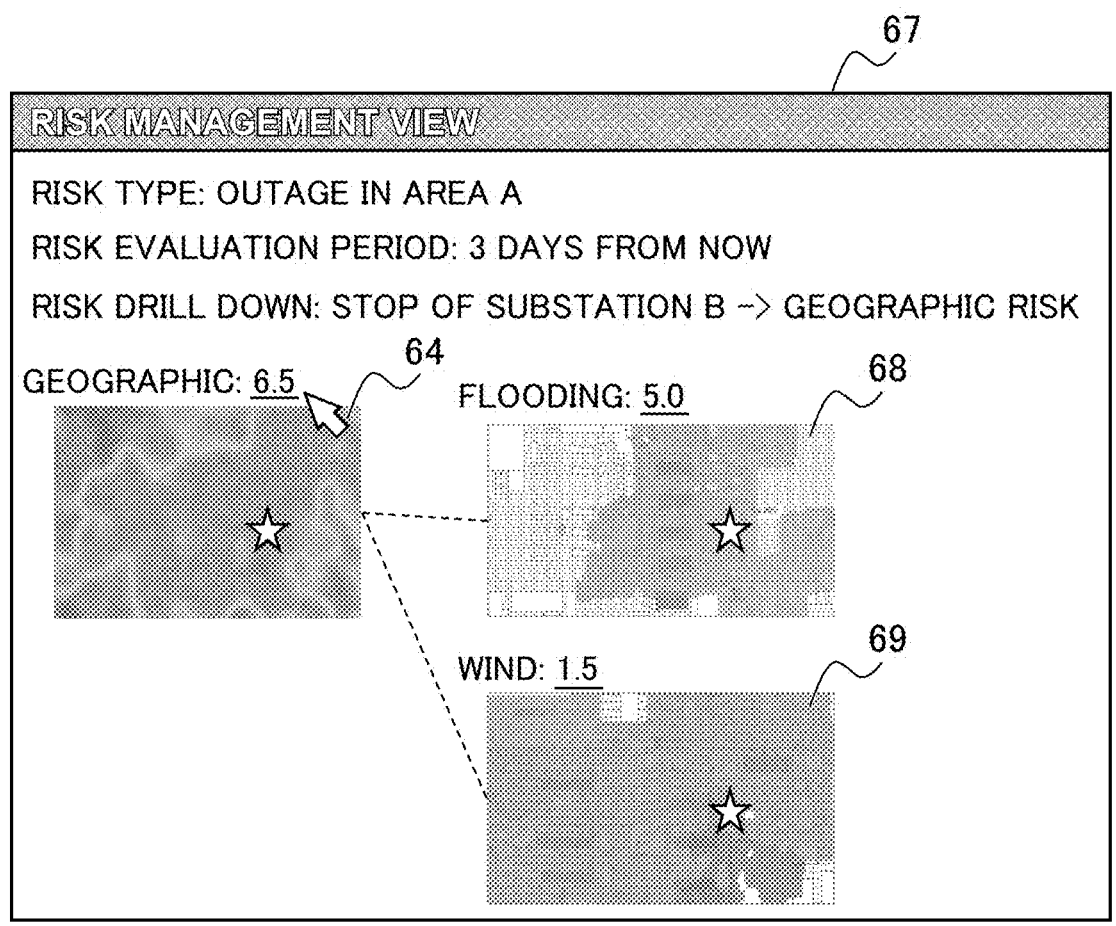
FIG. 14 is a diagram showing an example of a display screen.

FIGS. 12, 13, and 14 are diagrams showing examples of display screens.

When the person in charge of service management selects a menu for evaluating a power outage risk in a specific area, risk evaluation values for assets in that area are displayed as shown in FIG. 12. In the example of FIG. 12, an image object 62 corresponding to each risk element and displaying its risk evaluation value is displayed on a window screen 61 in a size corresponding to the integrated risk evaluation value.

When the user further selects and clicks one image object 62a from the window screen 61 of FIG. 12, a window screen 63 of FIG. 13 is displayed. The window screen 63 in FIG. 13 displays a geo-topography risk model 64, a connection relation risk model 65, and an asset internal risk model 66 for the selected risk element.

When the user further selects and clicks the geo-topography risk model 64 from the window screen 63 of FIG. 13, a window screen 67 of FIG. 14 is displayed. The window screen 67 displays a geo-topography risk model 64 and a flood simulation result screen 68 and a wind simulation result screen 69 associated therewith. The risk evaluation value for each location in the geo-topography risk model 64 is calculated by integrating the results of flood and wind simulations. The user can confirm the result of the flood simulation and the result of the wind simulation on the window screen 67 of FIG. 14.

The present embodiment described above includes items shown below. However, the items included in the present embodiment are not limited to those shown below.

(Item 1)

A risk management system for managing a risk of a fault occurring in a management target system including a plurality of assets arranged in each location and connected to each other, comprises:
- a risk modeling unit which stores static configuration information of each asset included in the management target system, acquires risk element information indicating risk elements each of which becomes a factor causing a fault, specifies the asset capable of becoming a fault due to the risk element indicated in the risk element information, and a fault probability being a probability that the asset becomes the fault, on the basis of the static configuration information, and generates in advance a risk model in which the asset capable of becoming the fault and the fault probability are associated; and
- a risk mapping unit which in response to a designated input to be evaluated, specifies at least one asset to be evaluated as an evaluation target asset, on the basis of the designated input, specifies a risk model related to the evaluation target asset, calculates a risk evaluation value being an index indicating a risk of the evaluation target asset, on the basis of the fault probability of the evaluation target asset and the static configuration information, and associates the asset of the risk model with the risk evaluation value of the evaluation target asset.

Consequently, since the risk model is generated in advance on the basis of the static configuration information, the risk model related to the designated evaluation target asset is specified, and the risk model is associated with the risk evaluation value on the basis of the fault probability, it is possible to realize appropriate risk management considering the configuration of the management target system.

(Item 2)

In the risk management system described in the item 1, the risk mapping unit acquires dynamic monitoring information related to the evaluation target asset, recalculates the fault probability of the evaluation target asset, on the basis of the monitoring information, and calculates a risk evaluation value being an index indicating a risk of the evaluation target asset, on the basis of the corrected fault probability of the evaluation target asset and the static configuration information.

Consequently, since the risk evaluation value is calculated on the basis of the fault probability recalculated on the basis of the dynamic monitoring information, it is possible to realize satisfactory risk management reflecting dynamic information about the asset.

(Item 3)

In the risk management system described in the item 1, the static configuration information includes asset information including a location and an internal state of each asset included in the management target system, configuration information including a connection between the assets, and geo-topography information being geographic and topographic information for the area in which the asset of the management target system is arranged, when the risk element is related to geography and topography, the risk modeling unit generates a geo-topography risk model by associating the asset capable of becoming a fault due to the risk element and the fault probability of the asset with the location of the asset in the geo-topography information, when the risk element is related to the connection between the assets, the risk modeling unit generates a connection relation risk model by associating the fault probability of the asset capable of becoming the fault due to the risk element with the corresponding asset in the configuration information and when the risk element is related to the internal state of the asset, the risk modeling unit generates an asset internal risk model by associating the fault probability of the asset capable of becoming the fault with the corresponding asset.

According to this, the risk model suitable for the risk related to the geography and topography, the risk model suitable for the risk related to the connection between the assets, and the risk model suitable for the risk of the asset internal state make it possible to appropriately manage the risk of the management target system including the plurality of assets arranged in their locations and connected to each other.

(Item 4)

In the risk management system described in the item 3, the risk mapping unit calculates a risk evaluation value being an index indicating the risk of the evaluation target asset, on the basis of a fault probability of the evaluation target asset, a severity index being an index related to the presence or absence of an alternative means for the asset, and a recovery cost which is the cost required for recovery when the asset fails.

According to this, appropriate risk management is made possible by the risk evaluation value which considers not only the occurring probability of a fault but also the presence or absence of the alternative means, and the cost required for the recovery of the fault.

(Item 5)

In the risk management system described in the item 4, the risk evaluation value of the asset is a value obtained by multiplying the fault probability of the asset, the severity index, and the recovery cost.

(Item 6)

In the risk management system described in the item 2, the monitoring information includes one or more of facility operation information indicating an operation state of the evaluation target asset, weather information of an area related to the evaluation target asset, and maintenance security information indicating a state of execution of the maintenance and security of the asset.

[Item 7]

In the risk management system described in the item 3, the management target system is a power grid, the risk elements include a typhoon, a cyber attack, and an equipment failure, the risk element is related to geography and topography in the case of the typhoon, the risk element is related to the connection in the case of the cyber attack, and the risk element is related to the internal state in the case of the equipment failure.

[Item 8]

In the risk management system described in the item 1, it further has a display unit which displays, on the basis of the risk model with which the risk evaluation value is associated, a screen in which node image objects corresponding to the assets are connected by a link image object corresponding to the connection between the assets, and the node image object is displayed in a color and/or shape on the basis of the risk evaluation value.

[Item 9]

In the risk management system described in the item 1, it further has a display unit which displays, on the basis of the risk model with which the risk evaluation value is associated, a screen in which node image objects corresponding to the assets are connected by a link image object corresponding to the connection between the assets, and the node image object is displayed in a color and/or shape on the basis of the risk evaluation value.

It should be noted that the above-described embodiments of the present invention are examples for explaining the present invention, and are not intended to limit the scope of the present invention only to those embodiments. Those skilled in the art can implement the present invention in various other forms without departing from the scope of the present invention.

What is claimed is:

1. A risk management system for managing a risk of a fault occurring in a management target system including a plurality of assets arranged in each location and connected to each other, comprising:

a risk modeling unit which stores static configuration information of each asset included in the management target system, acquires risk element information indicating risk elements each of which becomes a factor causing a fault, specifies the asset capable of becoming a fault due to the risk element indicated in the risk element information, and a fault probability being a probability that the asset becomes the fault, on a basis of the static configuration information, and generates in advance a risk model in which the asset capable of becoming the fault and the fault probability are associated;

a simulation execution unit which executes a risk simulation including at least one of a flood simulation, a wind simulation, a power demand simulation, and a failure simulation to generate simulation results, wherein the risk modeling unit generates the risk model based on the simulation results;

a risk mapping unit which in response to a designated input to be evaluated, specifies at least one asset to be evaluated as an evaluation target asset, on a basis of the designated input, specifies a risk model related to the evaluation target asset, calculates a risk evaluation value being an index indicating a risk of the evaluation target asset, on a basis of the fault probability of the evaluation target asset and the static configuration information, and associates the risk evaluation value of the evaluation target asset with the asset of the risk model; and a display unit which displays, on a basis of the risk model with which the risk evaluation value is associated, a screen in which node image objects corresponding to the assets are connected by a link image object corresponding to the connection between the assets, wherein a decision maker uses a result of the risk of the evaluation target asset to manage an issue in a plant with respect to at least one of a flood, wind, power demand, and failure.

2. The risk management system according to claim 1, wherein the risk mapping unit acquires dynamic monitoring information related to the evaluation target asset, recalculates the fault probability of the evaluation target asset, on a basis of the monitoring information, and calculates a risk evaluation value being an index indicating a risk of the evaluation target asset, on a basis of corrected fault probability of the evaluation target asset and the static configuration information.

3. The risk management system according to claim 1, wherein the static configuration information includes asset information including a location and an internal state of each asset included in the management target system, configuration information including a connection between the assets, and geo-topography information being geographic and topographic information for an area in which the asset of the management target system is arranged, wherein when the risk element is related to geography and topography, the risk modeling unit generates a geo-topography risk model by associating the asset capable of becoming a fault due to the risk element and the fault probability of the asset with the location of the asset in the geo-topography information, wherein when the risk element is related to the connection between the assets, the risk modeling unit generates a connection relation risk model by associating the fault probability of the asset capable of becoming the fault due to the risk element with a corresponding asset in the configuration information, and wherein when the risk element is related to the internal state of the asset, the risk modeling unit generates an asset internal risk model by associating the fault probability of the asset capable of becoming the fault with the corresponding asset.

4. The risk management system according to claim 3, wherein the risk mapping unit calculates a risk evaluation value being an index indicating the risk of the evaluation target asset, on the basis of a fault probability of the evaluation target asset, a severity index being an index related to presence or absence of an alternative means for the asset, and a recovery cost which is the cost required for recovery when the asset fails.

5. The risk management system according to claim 4, wherein the risk evaluation value of the asset is a value obtained by multiplying the fault probability of the asset, the severity index, and the recovery cost.

6. The risk management system according to claim 2, wherein the monitoring information includes one or more of facility operation information indicating an operation state of the evaluation target asset, weather information of an area related to the evaluation target asset, and maintenance security information indicating a state of execution of the maintenance and security of the asset.

7. The risk management system according to claim 3, wherein the management target system is a power grid, wherein the risk elements include a typhoon, a cyber attack, and an equipment failure, wherein the risk element is related to geography and topography in a case of the typhoon, wherein the risk element is related to the connection in the case of the cyber attack, and wherein the risk element is related to the internal state in the case of the equipment failure.

8. The risk management system according to claim 1, wherein the node image object is displayed on the display unit in a color on a basis of the risk evaluation value.

9. The risk management system according to claim 1, wherein the node image object is displayed on the display unit in a shape on a basis of the risk evaluation value.

10. A risk management method for managing a risk of a fault occurring in a management target system including a plurality of assets arranged in each location and connected to each other, comprising:

storing static configuration information of each asset included in the management target system, acquiring risk element information indicating risk elements each of which becomes a factor causing a fault, specifying the asset capable of becoming a fault due to the risk element indicated in the risk element information, and a fault probability being a probability that the asset becomes the fault, on a basis of the static configuration information, executing a risk simulation including at least one of a flood simulation, a wind simulation, a power demand simulation, and a failure simulation to generate simulation results, and generating in advance a risk model in which the asset capable of becoming the fault and the fault probability are associated, wherein the risk model is generated based on the simulation results;

in response to a designated input to be evaluated, specifying at least one asset to be evaluated as an evaluation target asset, on a basis of the designated input, specifying a risk model related to the evaluation target asset, calculating a risk evaluation value being an index indicating a risk of the evaluation target asset, on a basis of the fault probability of the evaluation target asset and the static configuration information, and associating the risk evaluation value of the evaluation target asset with the asset of the risk model; and displaying, on a basis of the risk model with which the risk evaluation value is associated, a screen in which node image objects corresponding to the assets are connected by a link image object corresponding to the connection between the assets, wherein a decision maker uses a result of the risk of the evaluation target asset to manage an issue in a plant with respect to at least one of a flood, wind, power demand, and failure.

* * * * *